(No Model.)
V. C. HUEY
FENCE POST.
No. 430,126. Patented June 17, 1890.
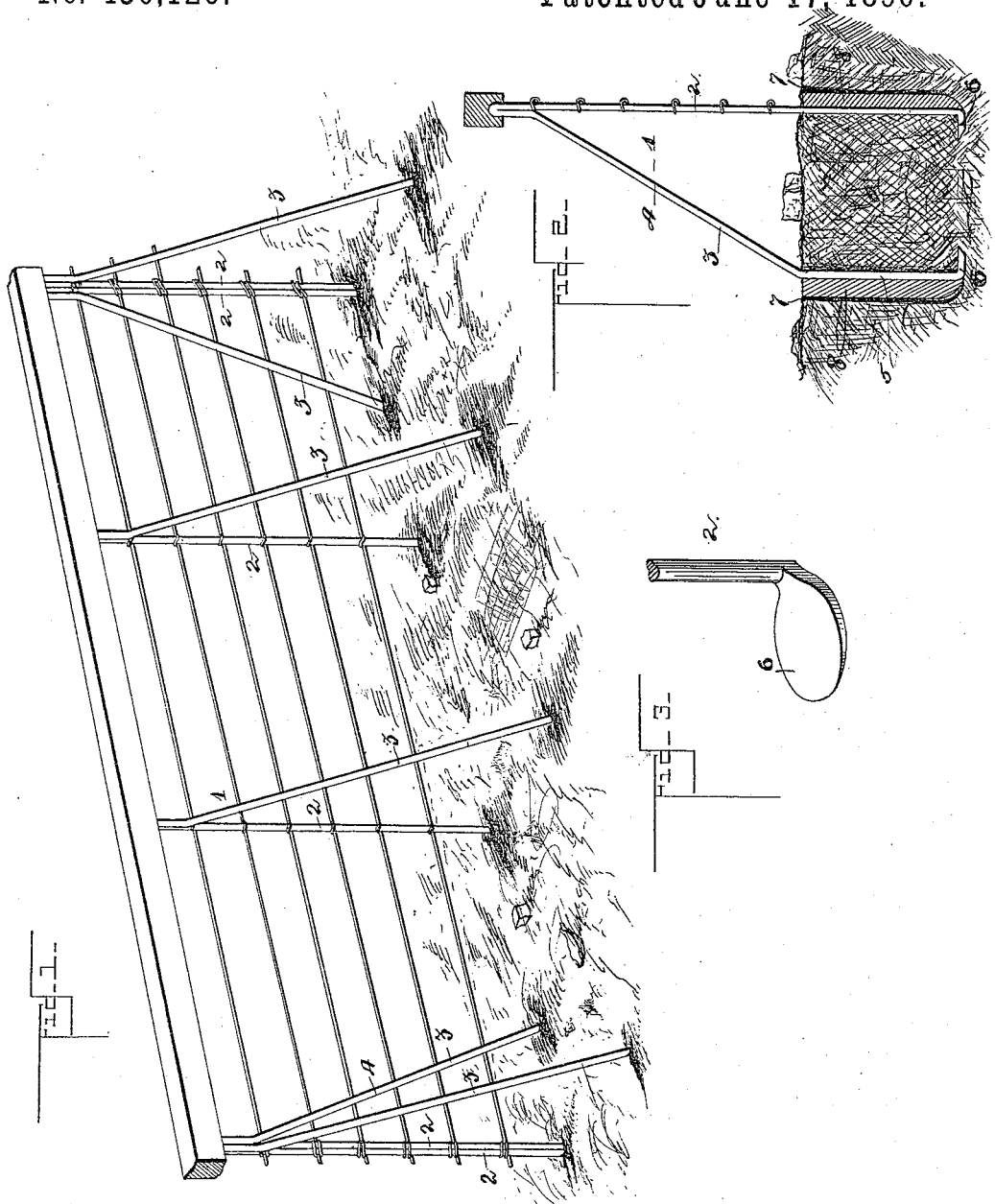
Witnesses
Horace G. Seitz
N. J. Riley
Inventor
Vernon C. Huey,
By his Attorneys
C. A. Snow & Co.

UNITED STATES PATENT OFFICE.

VERNON C. HUEY, OF READING CENTRE, NEW YORK.

FENCE-POST.

SPECIFICATION forming part of Letters Patent No. 430,126, dated June 17, 1890.

Application filed February 24, 1890. Serial No. 341,456. (No model.)

*To all whom it may concern:*

Be it known that I, VERNON C. HUEY, a citizen of the United States, residing at Reading Centre, in the county of Schuyler and State of New York, have invented a new and useful Fence-Post, of which the following is a specification.

The invention relates to improvements in fence-posts.

The object of the present invention is to provide a simple, strong, and durable fence-post capable of being readily and securely anchored in the ground and of successfully withstanding the strains incident to its use.

The invention consists in the construction and novel combination and arrangement of parts hereinafter fully described, illustrated in the accompanying drawings, and pointed out in the claims hereto appended.

In the drawings, Figure 1 is a perspective view of a fence embodying the invention. Fig. 2 is a side elevation of a fence-post shown applied in operative position. Fig. 3 is a detail view of the lower end of the post.

Referring to the accompanying drawings, 1 designates a fence-post constructed of metal, and consisting of the vertical bar 2 and the inclined brace-bar 3, that is suitably secured at its upper end to the vertical bar 2, and may, if desired, be formed integral therewith. The brace-rod 3 has its upper portion 4, which extends above the ground, inclined or slanting and arranged in the plane of the fence and adapted to brace the vertical rod 2, and the lower portion 5, which is embedded in the ground, is vertical and lies parallel with the lower portion of the vertical rod 2 of the post. The lower ends of the vertical rod 2 and the brace-rod 3 are provided with horizontal projections or flanges 6, that extend inward toward the adjacent bar and toward each other, and are adapted, after the post has been inserted in suitable holes, to be driven into the ground and maintained therein, and thereby securely prevent the post leaving the ground and enabling it to successfully withstand all the strains incident to its use. Suitable holes 7 are dug, and the parallel portions of the post are inserted in the holes, and the horizontal projections or flanges are driven in the sides of the holes by wedges 8, that are arranged upon the outer sides of the post and drive the horizontal projections or flanges inward toward each other and enable them to take a firm hold to prevent the post being accidentally withdrawn or torn from the ground. The post is designed to be employed in the construction of wire and wooden fences, and may have its upper portion provided with notches, openings, or recesses to enable the wires or boards to be readily secured in place; and I desire it to be understood that I do not limit myself to the precise details of construction herein shown and described, as I may, without departing from the spirit of the invention, make minor changes therein.

From the foregoing description and the accompanying drawings the construction, operation, and advantages of the invention will readily be understood.

What I claim is—

1. A fence-post comprising the vertical bar 2 and the brace-rod 3, having its lower end 5 vertical and parallel with the lower portion of the bar 2, said bars having upon their inner facing sides at their lower ends horizontal projections or flanges arranged to be driven laterally into the ground after the insertion of the fence-post, substantially as and for the purpose described.

2. The combination, in a fence-post, of the vertical bar 2, provided at its lower end with a horizontal projection or flange 6, arranged upon the inner side of the bar, the inclined brace-rod 3, having its lower portion 5 arranged parallel with the vertical bar 2, and provided at its lower end with a horizontal projection or flange arranged at the inner side of the brace, and the wedges designed to be driven at the outer sides of the post to force the horizontal projections or flanges inward or toward each other and enable them to take a firm hold on the ground, substantially as described.

3. The fence-post comprising the vertical bar 2, having the horizontal projection 6 extending inward, and the wedge to be driven vertically alongside the bar to force the horizontal projection inwardly, as set forth.

In testimony that I claim the foregoing as my own I have hereto affixed my signature in presence of two witnesses.

VERNON C. HUEY.

Witnesses:
T. T. CHANDLER,
SIDNEY ELLIS.